(12) United States Patent
Welder et al.

(10) Patent No.: US 7,814,481 B1
(45) Date of Patent: Oct. 12, 2010

(54) METHOD AND SYSTEM FOR MINIMAL DISRUPTION DURING SOFTWARE UPGRADE OR RELOAD OF A NETWORK DEVICE

(75) Inventors: John Thomas Welder, San Jose, CA (US); Ratheesh Krishna Vadhyar, Irinjalakuda (IN); Sudhir Rao, San Jose, CA (US); Thomas W. Uban, Valpraiso, IN (US)

(73) Assignee: Cisco Technology, Inc., San Jose, CA (US)

( * ) Notice: Subject to any disclaimer, the term of this patent is extended or adjusted under 35 U.S.C. 154(b) by 1915 days.

(21) Appl. No.: 10/646,453

(22) Filed: Aug. 21, 2003

(51) Int. Cl.
  *G06F 9/445* (2006.01)
  *G06F 15/177* (2006.01)
(52) U.S. Cl. .......................... 717/176; 713/2
(58) Field of Classification Search ................. 717/168
  See application file for complete search history.

(56) References Cited

U.S. PATENT DOCUMENTS

| | | | | |
|---|---|---|---|---|
| 5,263,168 | A * | 11/1993 | Toms et al. .................. | 713/1 |
| 6,154,849 | A | 11/2000 | Xia | |
| 6,397,385 | B1 | 5/2002 | Kravitz | |
| 6,535,924 | B1 | 3/2003 | Kwok et al. | |
| 6,601,186 | B1 | 7/2003 | Fox et al. | |
| 6,639,910 | B1 * | 10/2003 | Provencher et al. ......... | 370/351 |
| 6,658,659 | B2 * | 12/2003 | Hiller et al. ................. | 717/170 |
| 6,880,086 | B2 | 4/2005 | Kidder et al. | |
| 6,983,362 | B1 * | 1/2006 | Kidder et al. ................. | 713/1 |
| 7,062,642 | B1 * | 6/2006 | Langrind et al. .............. | 713/1 |
| 7,222,147 | B1 | 5/2007 | Black et al. | |
| 7,225,244 | B2 | 5/2007 | Reynolds et al. | |
| 7,525,973 | B1 * | 4/2009 | McRae ....................... | 370/396 |
| 2003/0084440 | A1 * | 5/2003 | Lownes ........................ | 725/6 |
| 2003/0157899 | A1 * | 8/2003 | Trossen et al. ................ | 455/69 |
| 2006/0233182 | A1 | 10/2006 | Appanna et al. | |
| 2007/0162565 | A1 | 7/2007 | Hanselmann | |

OTHER PUBLICATIONS

Li, V.O.K.; Zaichen Zhang, "Internet multicast routing and transport control protocols," Proceedings of the IEEE , vol. 90, No. 3, pp. 360-391, Mar. 2002, URL: http://ieeexplore.ieee.org/stamp/stamp.jsp?arnumber=993404&isnumber=21426.*
Gallo et al. "Networking Explained, Second Edition" Dec. 15, 2001, Digital Press, pp. 42-44.*
Baumann, Andrew; "Improving Operating System Availability With Dynamic Update", Sep. 14, 2004, 7 pgs.
Riverstone Networks Whitepapers, "MPLS/VPLS Evolution: A Riverstone Perspective", Nov. 5, 2004, 9 pgs.
Bowen et al., "Availability in parallel systems: Automatic process restart", Feb. 1997, 17 pgs.
U.S. Appl. No. 11/446,490, filed Jun. 1, 2006; Prosecution History.
Roch, Benjamin; "Monolithic kernel vs. Microkernel", Jul. 7, 2004.

* cited by examiner

*Primary Examiner*—James Rutten
(74) *Attorney, Agent, or Firm*—Stolowitz Ford Cowger LLP

(57) ABSTRACT

A method and system for resetting a network device. Specifically, in one embodiment, a method is disclosed for upgrading and/or reloading software for a network device with minimal disruption. The method begins by separating operations associated with layer two of an International Standardization Organization Open Systems Interconnect (ISO/OSI) reference model from other layers in the ISO/OSI reference model in a network device. Then, the software operations in layer two of the network device are reset. The software operations are reset while maintaining continuity for a communication session between the network device and other network devices coupled together through a network. Thereafter, for minimal disruption, execution of the software operations is recovered at layer two before continuity of the communication session s terminated.

43 Claims, 6 Drawing Sheets

METHOD AND SYSTEM FOR MINIMAL DISRUPTION DURING SOFTWARE UPGRADE OR RELOAD OF A NETWORK DEVICE

BACKGROUND OF THE INVENTION

1. Field of the Invention

Embodiments of the present invention relate to the field of network communications. More particularly, embodiments of the present invention relate generally to reloading and upgrading software in network devices.

2. Related Art

A network provides an infrastructure that facilitates communication between electronic systems, or computer systems, associated with end users. Internetworking protocols allow for the transfer of communication between two or more individualized networks. As such, smaller, individualized networks, such as, local area networks (LAN), are combined into a larger internetwork cable of providing communication services to an ever increasing number of end users. For example, the Internet is a global interconnection of individual networks.

Network devices are hardware devices that facilitate communication through a network. For example, the heart of any network includes hubs, switches, routers, access servers, and firewalls. The hub acts as a central point to host computers associated with end users in a local network. As such, the host computers and the hub make up a LAN segment. A switch connects the host computers of a particular LAN to an internetwork of a collection of LANs. The switch provides for a single switched virtual circuit to facilitate communication between two host devices through a larger internetwork across two or more LANs. Access servers connect remote users that are not part of any network to one or more networks. Firewalls act as checkpoints that check message traffic for harmful and unwanted data before routing the traffic through. Routers are intelligent devices that forward message traffic based on the Internet protocol (IP) addresses provided.

Upgrades to software that are used for implementing specific features or services as provided by a network device are necessary to capture new features, enhancements, and fixes to programming errors. For example, software upgrades are implemented when customers want or need new and additional features added to their existing software applications. Also, solutions to specific programming errors require an upgrade to their existing software applications. As a result, these new software upgrades are provided for in software images.

However, a significant impact on the availability of a network device occurs when upgrading associated software. In general, hardware associated with the network device needs resetting and the network device requires rebooting to initialize upgrades to software associated with a network device. This network device downtime problem occurs also when resetting the network device after a general failure that does not require any software upgrades. As a result, downtime of a particular network device impacts the capability of an associated network to pass communication.

In particular, delays occurring during the installation of upgrades, or during a reset of software, can be attributed to the loading of the software image code and the resetting of hardware components associated with the network device. Because of these issues, the network device with software to be upgraded is cutoff from an associated network. This leads to termination of current communication sessions held between the network device that is being upgraded and other network devices.

Specifically, prior art methods brought the network device down from the network when installing the software image. The software image comprises the programming code for the upgrade or reset of software that runs a network device. In some cases, the software image is transferred from a secondary device, such as, a hard disk, floppy disk, CDROM, etc. In other cases, the software image is downloaded from a server through the network. For example, the software images can be loaded from flash cards, disks, or from a trivial file transfer protocol (TFTP) server via a network.

Also, prior art methods required the blanket reset of many hardware components associated with the network device. As such, hardware components are reset during an upgrade to the software, and the network device is rebooted from scratch in order to initialize the upgraded software images.

In both cases, these may lead to the physical layer of a network going down. This effect would spread to upper layers in a network or communication session, resulting in route flaps, traffic loss, etc. These other network devices may also undergo their own software reset as a result of the termination of the communication session, thereby proliferating further delays throughout a network due to network device downtimes. As such, an entire network may be affected because of a software upgrade on a single network device. Since the availability of a network device is critical and software upgrades are necessary, it is important to reduce the downtime of a network device during a software upgrade.

SUMMARY OF THE INVENTION

Accordingly, various embodiments of the present invention disclose a method and system for minimal disruption of communication during the upgrading and resetting of network devices. As a result, the upgrading and reloading of system software of a network device is performed with minimal delay to reduce the downtime of the network device. Moreover, the upgrading and reloading of the system software is performed without resetting all of the hardware components of the network device, thereby limiting the impact on the control plane when communicating through a network.

Specifically, in one embodiment, a method is disclosed for resetting a network device that provides for minimal disruption of communication. The method is implemented when upgrading system software associated with the network device, or when reloading the system software upon system failure.

The method begins by separating operations associated with layer two of an International Standardization Organization Open Systems Interconnect (ISO/OSI) reference model from other layers in the ISO/OSI reference model in a network device. In essence, the data plane is separated from the control plane in the network device. As a result, current communication sessions involving the network device upon which a software upgrade or reload at layer two is being performed will continue to be controlled at the control plane without being terminated, despite having data forwarded through layer two being suspended.

The method continues by resetting the software operations at layer two of the network device. The software operations are reset/suspend while maintaining continuity for a communication session between the network device and other network devices coupled together through a network. Resetting is implemented by loading the software image that implements the software operations to main memory of the network device. This is accomplished before initiating the actual upgrading process.

In addition, a minimum reset of hardware components that are associated with the network device is performed. Reset/suspend of hardware components is accomplished to remove interruptions to the operating code of the network device. As such, these interruptions are removed before transferring to the software image that previously was loaded during the upgrading process. In this way, interruptions from those hardware components will not occur when the operating system of the network device is down during the upgrading process.

Thereafter, for minimal disruption, execution of the software operations is recovered at layer two before continuity of the communication session is terminated. This is accomplished by executing a bootstrap code. Bootstrap code is loaded to the main memory before initiating the upgrade/reload process. The bootstrap code performs a raw copy of the software image to a predetermined location in memory. The predetermined location comprises the code for implementing the software operations. During the raw copy, the software image overwrites any code, e.g., the old software image, at the predetermined location in memory.

DETAILED DESCRIPTION OF THE INVENTION

Reference will now be made in detail to the preferred embodiments of the present invention, a method and system of upgrading and/or reloading system software on a network device with minimal disruption of communication, examples of which are illustrated in the accompanying drawings.

Accordingly, various embodiments of the present invention provide for the upgrading and reloading of system software of a network device that is performed with minimal delay to reduce the downtime of the network device. Moreover, the upgrading and reloading of the system software is performed without resetting all of the hardware components of the network device, thereby limiting the impact on the control plane when communicating through a network. As an advantage, embodiments of the present invention are able to upgrade and reload system software on a network device without terminating the continuity of communication sessions between the network device and other network devices in a network. Furthermore, the system software is reloaded or upgraded without dropping any communication sessions between end users within a network.

Notation and Nomenclature

Figure 1:
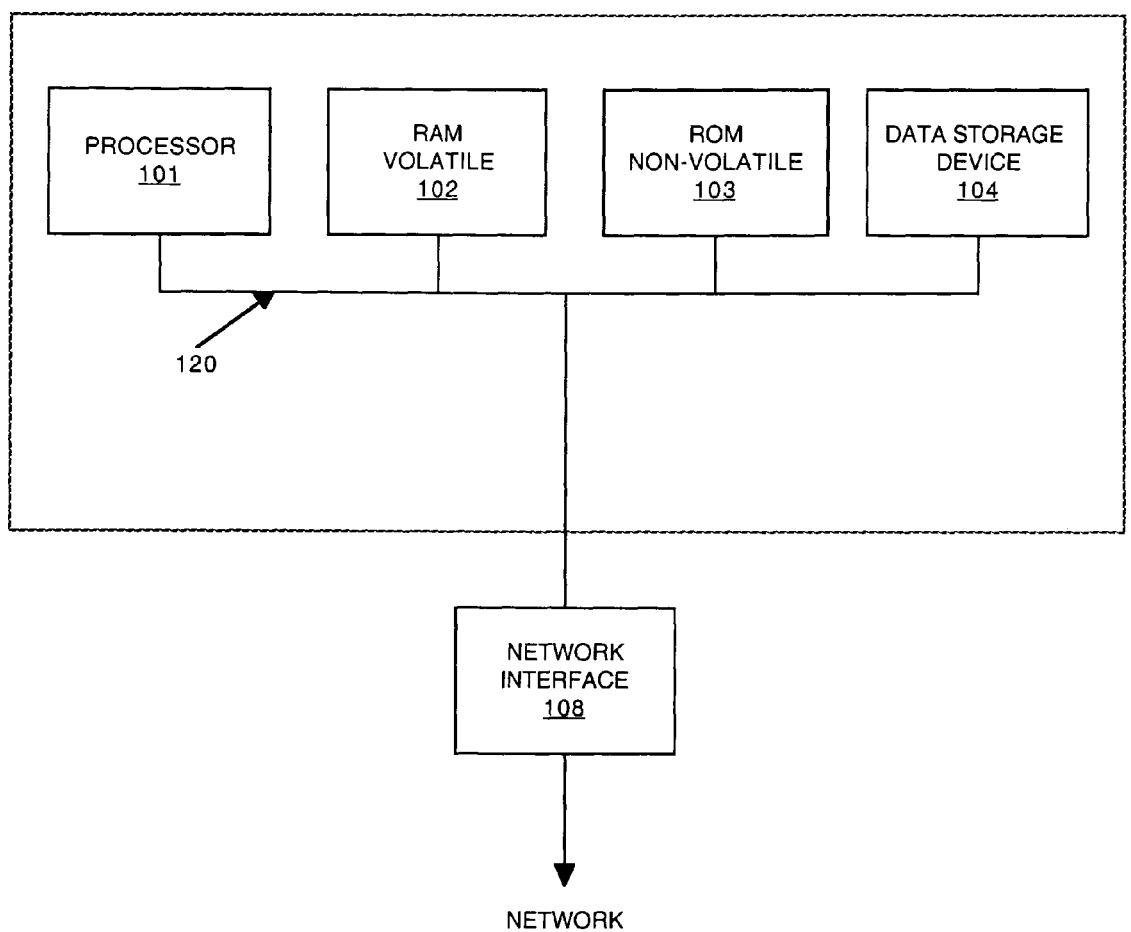
FIG. 1 is a block diagram of an electronic device that is capable of upgrading and/or reloading system software with minimal disruption to communication sessions involving the network device, in accordance with one embodiment of the present invention.

Referring now to FIG. 1, portions of the present invention are comprised of computer-readable and computer-executable instructions which reside, for example, in computer-readable media of an electronic system that are networked devices, such as, a server computer, mainframe, networked computer, workstation, hub, router, switch, firewall, access server, and the like. FIG. 1 is a block diagram of interior components of an exemplary electronic system 100, upon which embodiments of the present invention may be implemented.

While embodiments of the present invention are described within the context of networked devices, other embodiments of the present invention are well suited to implementations within any electronic device. More specifically, other embodiments of the present invention are well suited for methods and systems of upgrading and/or reloading system software on any electronic device.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing," "separating," "resetting," "maintaining," "recovering," and "loading," and "executing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for Minimal Disruptive Restart

Figure 2:
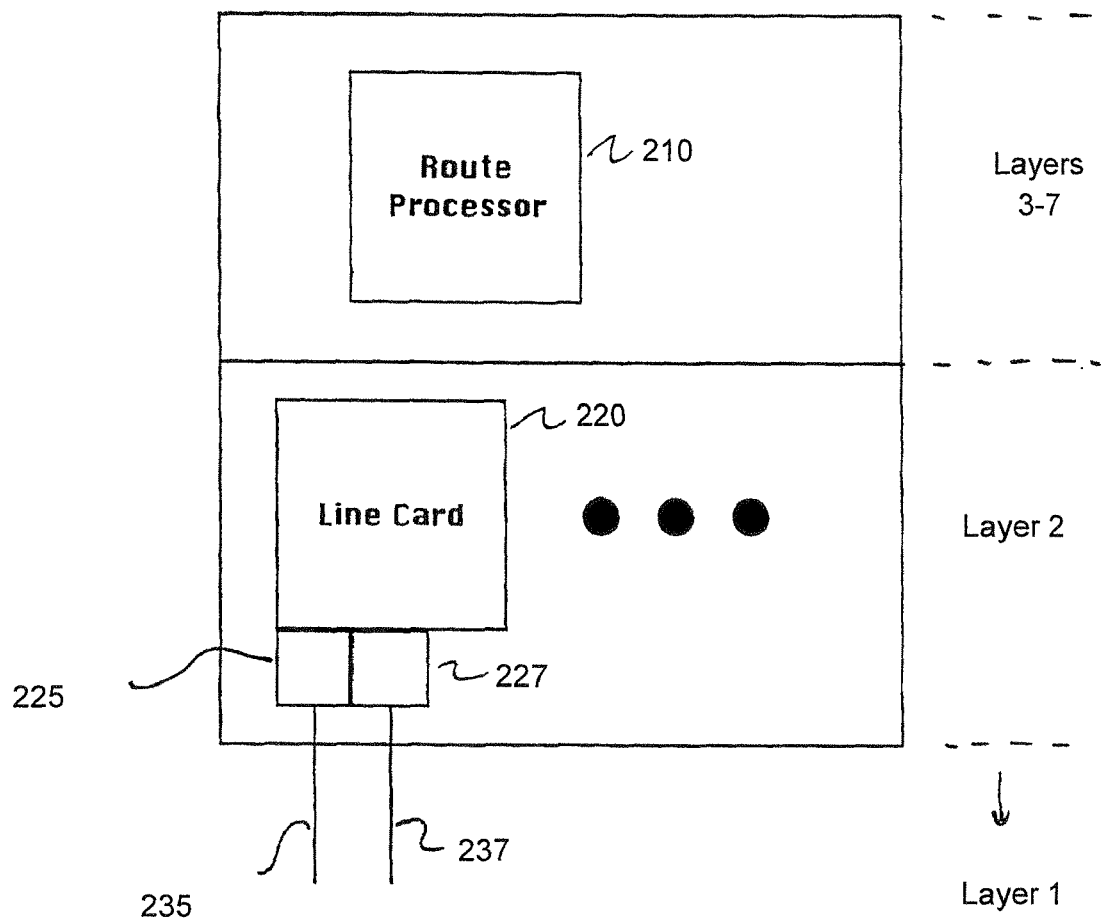
FIG. 2 is a block diagram of a network device that is capable of upgrading and/or reloading system software with minimal disruption to communication sessions involving the network device, in accordance with one embodiment of the present invention.

Referring now to FIG. 2, a block diagram of a network device 200 that is capable of upgrading and/or reloading hardware with minimal disruption to communication sessions is disclosed, in accordance with one embodiment of the present invention. FIG. 2 is an exemplary diagram of the implementation of the International Organization for Standardization Open Systems Interconnection (ISO/OSI) reference model within the network device 200. The ISO/OSI reference model provides for a seven-layered architecture within network devices that standardizes interconnections between communicating network devices through a network.

As described previously, the network device 200 is any electronic system that facilitates communication between end users in a network. For example, in embodiments of the present invention, the network device 200 is a hub, or a switch, or a router, or a server, or an access server, or a firewall, etc.

For purposes of illustrating the methods and systems of the present Application, the network device 200 is divided into three parts. Each of the parts of the network device 200 is associated with one or more layers in the ISO/OSI reference model.

In the network device 200, the route processor 210 provides control plane functionality during communication sessions involving the network device 200. In relation to the ISO/OSI reference model, the route processor 210 provides functionality for layers three, four, five, six, and seven of the ISO/OSI reference model, or the network, transport, session, presentation, and application layers, respectively in the network device 200.

More specifically, the control plane of the network device 200 provides for keeping the network device 200 in the network. For example, in a network device 200 that is a router, the control plane provides the routing protocol layer to facilitate the routing of message traffic through the router. In addition, the control plane establishes and terminates connections for communication sessions between computers associated with end users. For example, the control plane will terminate a communication session after a predetermined time-out period.

Returning back to FIG. 2, the network device 200 also comprises a plurality of layer two devices. In the configuration of FIG. 2, the plurality of layer two devices comprises a plurality of add-on modules that are plugged into the network device 200. These add-on modules facilitate networking within a particular networking environment, and as such, are defined as network interface modules, or line cards. For example, in network device 200, the line card 220 is a layer two device. Line card 220, for instance, is an Ethernet card for facilitating the Ethernet networking protocol. In addition, the network device 200 comprises one or more layer two devices in various embodiments.

Communicatively coupled to the line card 220 is a plurality of port adapters. For example, line card 200 comprises port adapter 225 and port adapter 227. Each of the port adapters 225 and 227 provide an interface through which message traffic is transferred between the network device 200 and other devices on the network in a communication session. That is, the port adapters 225 and 227 provide an interface for connection to external network connections. While FIG. 2 discloses two port adapters associated with line card 220, other embodiments of the present invention are well suited to line cards comprising one or more port adapters.

The network device 200 is capable of upgrading and/or reloading software operations associated with the layer two devices while minimally disrupting the communication occurring at layers other than layer two in the ISO/OSI reference model. That is, the software operations at layer two of the network device is upgraded and/or reloaded without terminating the communication session at layers other than layer two of the ISO/OSI reference model.

Lines 235 and 237 comprise the physical layer, or layer one, of the ISO/OSI reference model for the network device 200. The physical layer, layer one, defines the communication medium by which message traffic is transferred through the port adapters of the network device 200. For example, the communication medium may be defined by electrical, mechanical, or optical characteristics. As such, the communication medium is comprised of, for example, twisted-pair cabling, fiber-optic cabling, coaxial cabling, etc.

Figure 3:
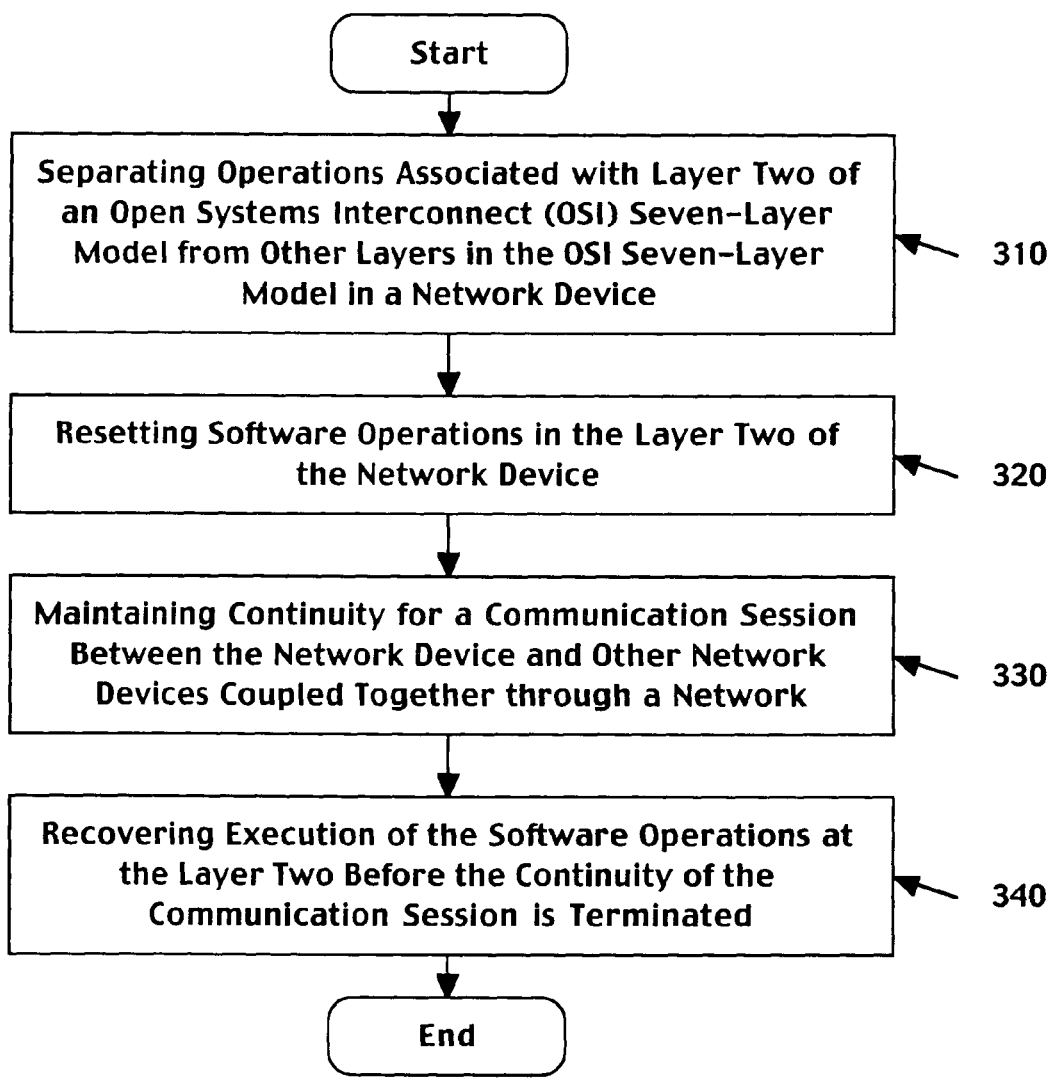
FIG. 3 is flow chart illustrating steps in a computer implemented method for upgrading and/or reloading software for a network device with minimal disruption to communication sessions involving the network device, in accordance with one embodiment of the present invention.

Now referring to FIG. 3, a flow chart 300 is disclosed illustrating steps in a computer implemented method for resetting a network device with minimal disruption to communication sessions involving the network device, in one embodiment of the present invention. The method illustrated in flow chart 300 is implemented when upgrading software associated with layer two components in the network device, in one embodiment. In another embodiment, the method illustrated in flow chart 300 is implemented when reloading software associated with layer two components in the network device, as when correcting a system failure.

At 310, the present embodiment begins by separating operations associated with layer two of the ISO/OSI reference model from other layers in the ISO/OSI reference model. That is, the data plane associated with layer two is separated from the control plane in the network device. The data plane is associated with layer two of the ISO/OSI reference model and controls the forwarding of traffic across the network device through the network device. The control plane is associated with layers 3-7 of the ISO/OSI reference model. The control plane controls and maintains communication sessions with other network devices when transmitting message traffic.

In addition, in another embodiment, once the data plane is separated from the control plane, the data plane is also effectively separated from the physical layer of the network device. That is layer two, the data plane, of the network device is separated from layer one, the physical layer, of the network device.

By separating the data plane from the control plane in the network device, the present embodiment creates an environment in which changes to the data plane are implemented with minimal impact on the control plane. Most importantly, software located at the data plane can be upgraded and/or reloaded without affecting the continuity of communication sessions managed by the control plane.

At 320, the present embodiment continues by resetting software operations in layer two of the network device. During the reset, the actual upgrade or reload of the software that implements the software operations is postponed, as will be fully described later in relation to FIG. 4. In this manner, minimal downtime is achieved when upgrading or reloading the new software.

At 330, the present embodiment continues by maintaining continuity for a communication session between said network device and other network devices coupled together through a network. As stated previously, by separating the data plane from the control plane, communication sessions can be maintained effectively even though the data plane is down due to upgrading or reloading of software. That is, the upgrading and/or reloading of new software at layer two of the network device is transparent to end users transmitting and receiving message traffic through communication sessions involving the network device. As such, the continuity of the communication session is maintained.

At 340, the present embodiment recovers execution of the software operations at layer two of the network device. Recovery is achieved before continuity of the communication sessions is terminated. That is, the new software that implements the software operations at layer two is initialized and operational before a time-out period occurs at the control plane and the physical layer.

In this way, an upgrading and/or reloading of the software at layer two of the network device is achieved without disrupting the communication sessions at other layers of the ISO/OSI reference model, namely the control plane (layers 3-7) and the physical layer (layer 1). As such, since continuity at the control plane and the physical layer is maintained, i.e., continuity of communication sessions, the control plane and the physical layer need not undergo a reset process, even though software at layer two of the network device is upgraded or reloaded.

Figure 4:
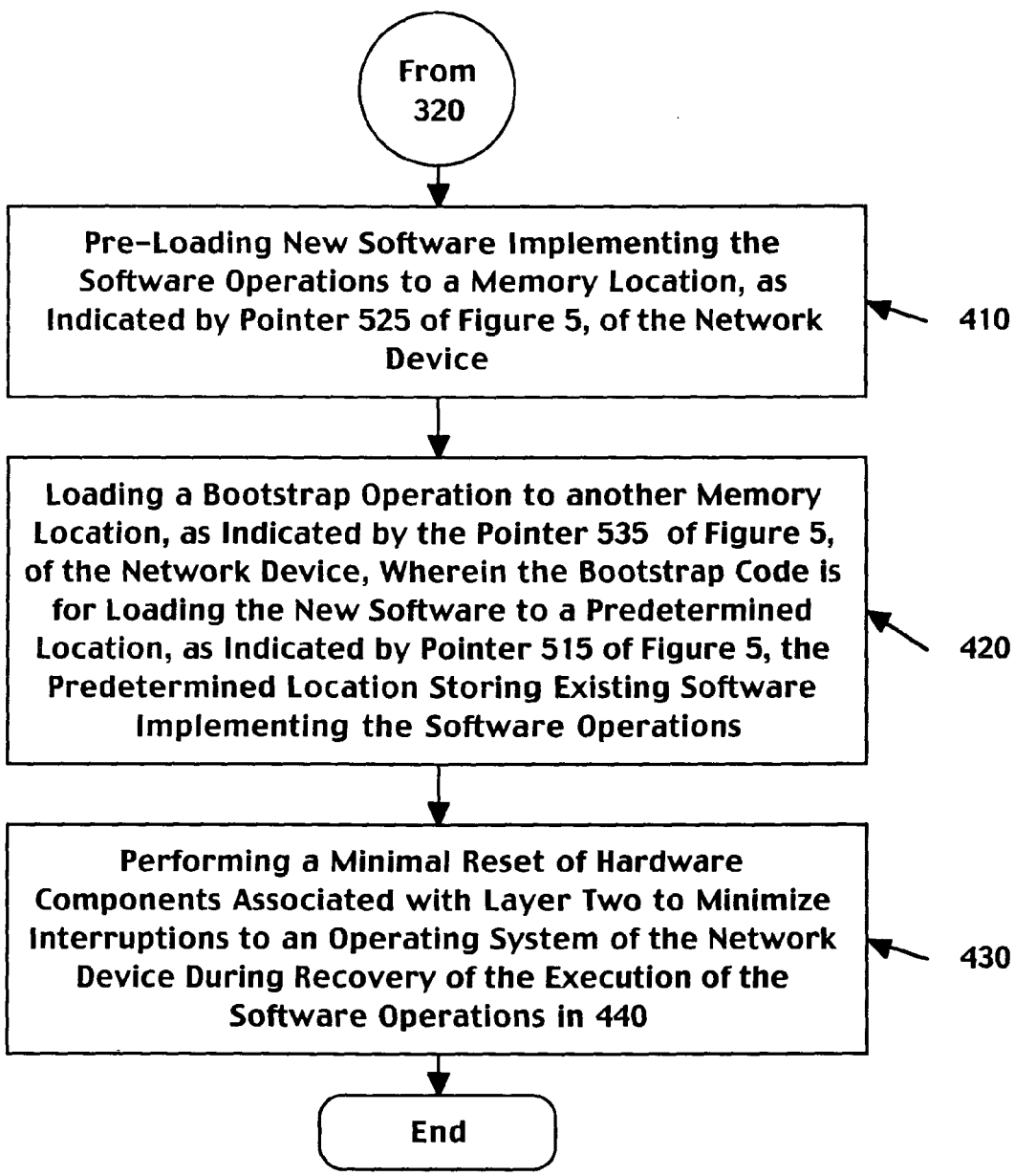
FIG. 4 is a flow chart illustrating steps in a computer implemented method for resetting software operations in a network device, in accordance with one embodiment of the present invention.

Referring now to FIG. 4, a flow chart 400 is described illustrating steps in a computer implemented method for upgrading and/or reloading software at layer two of a network device, in accordance with one embodiment of the present invention. Specifically, the flow chart 400 discloses the resetting of software operations in layer two of the ISO/OSI reference model in the network device. In one embodiment, the flow chart 400 is an extension of block 320 in FIG. 3.

Figure 5:
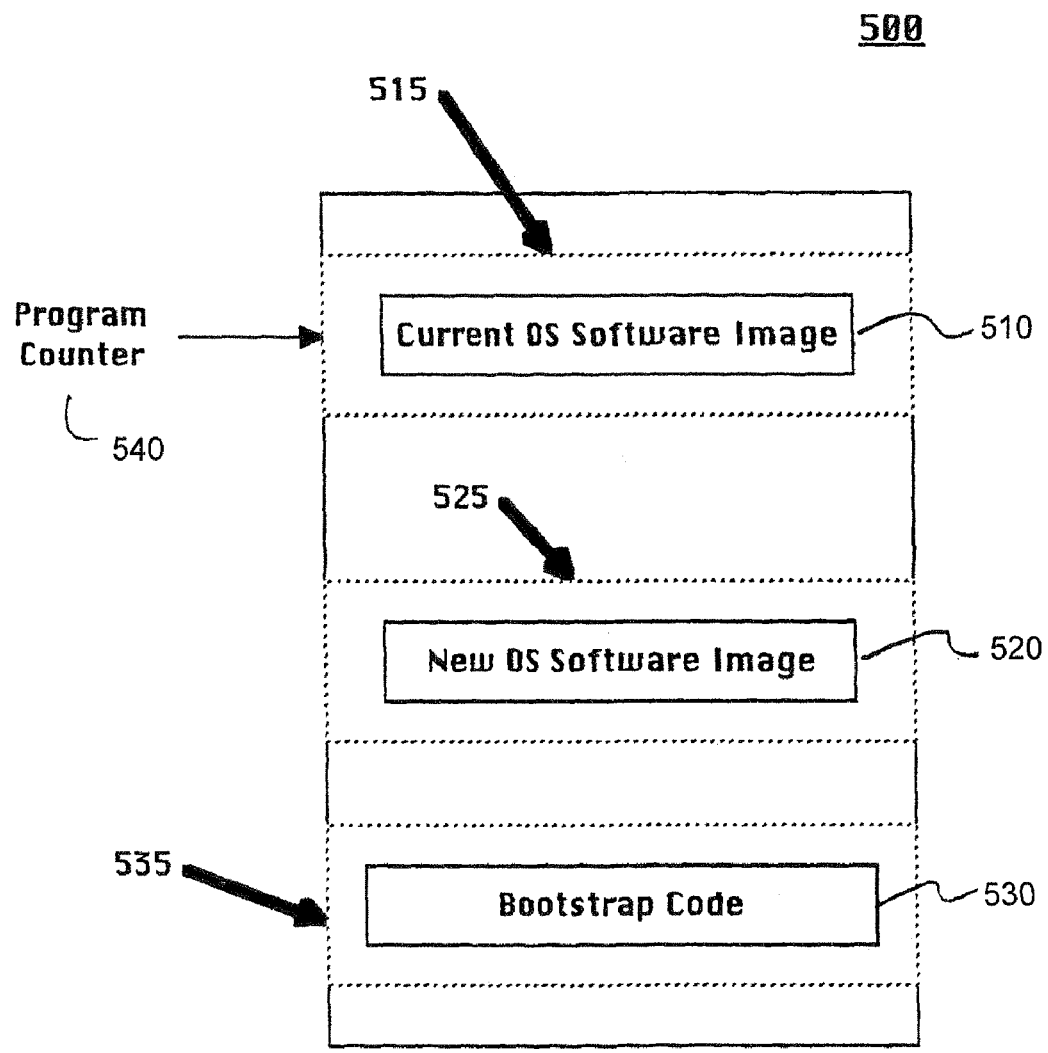
FIG. 5 is a diagram of memory illustrating the storage of existing software, new software, and a bootstrap code for replacing the existing software with the new software.

At 410, the present embodiment begins by pre-loading new software (e.g., software 520 of FIG. 5) to a memory location, as indicated by pointer 525 of FIG. 5 of the network device. The new software, after loading and initialization, implements the software operations associated with the network device. In one embodiment, the new software comprises a software image that implements the software operations. The new software is preloaded to the main memory of the network device before initializing the actual process for upgrading or reloading the software at layer two of the network device. In this way, the delay due to downtime of the network device when transferring the new software to the network device from a secondary source or device is eliminated.

At 420, the present embodiment continues by loading a bootstrap code (e.g. bootstrap code 530) to another memory location, as indicated by pointer 535 of FIG. 5, of the network device. Execution of the bootstrap code occurs during the upgrade process implemented in 430. As such, execution of the bootstrap code comprises executing instructions loading the new software to a predetermined location, as indicated by pointer 515, in the memory of the network device. More specifically, the execution of the bootstrap code executes instructions that performs a raw copy of the new software from the memory location, as indicated by pointer 525, to a designated and predetermined location, as indicated by pointer 515, as per design of the system.

The predetermined location, as indicated by pointer 515, stores the instructions in the memory of the network device for implementing the software operations associated with the network device. At present, an existing software for implementing software operations associated with the network device is located at the predetermined location. This bootstrap code replaces the existing software with the new software to implement the software operations associate with the network device. The new software contains upgraded features to be implemented in the software operations, in one embodiment. The new software is a working copy of the existing software, in another embodiment, and is reloaded when the existing software or network device fails.

FIG. 5 illustrates a memory 500 of the network device after implementing blocks 410 and 420 of flow chart 400. As a result, the memory 500 comprises storage of the current operating system (OS) software image in a predetermined location 510. In addition, the new OS image is located at a first location 520 in the memory 500. Also, the bootstrap code is located at a second location 530 in the memory 500.

FIG. 5 also illustrates the position of the program counter 540. The program counter comprises a memory register that defines the address of the next instruction for execution of a program sequence. The program counter is pointed at the current, or existing, OS software image, since the update process or reload process of the software associated with the network device has not been installed and initiated. As such, the network device is still operating under the existing OS software image.

Returning back to FIG. 4, at 430, the embodiment illustrating flow chart 400 continues by performing a minimal reset of hardware components associated with layer two of the OSI/ISO reference model in the network device. The minimal reset is performed to minimize interruptions to the operating system of the network device during recovery of the execution of software operations performed in block 340 of flow chart 300.

The reset of hardware components is unavoidable for certain reasons. Many hardware components generate interrupts during operation. These interrupts access certain portions of the software operations that is currently being upgraded or reloaded. However, during the recovery process of the software performed in block 340, the software operations are not available. This may result in unexpected behavior, e.g., further failures. The present embodiment is able to avoid these unexpected behaviors by addressing the interrupts before the actual upgrade or reload during the recovery of the execution of the software operations is performed in block 340.

Different hardware components will have different modes of reset. For example, a hardware component can have a soft (warm) reset, a hard (cold), or even a suspend operation, etc. Determining the types of resets performed and which of the hardware components need resetting is accomplished to remove interruptions to the software operations, as previously described. For minimal impact, the minimum number of reset to hardware components is performed to reduce the downtime associated when updating the software at layer two of a network device.

The hardware components comprise the devices supporting layer two of the ISO/OSI reference module of the network device. For example, in one embodiment, the hardware components are line cards. In other embodiments, the hardware components are contained within a specific line card, upon which the software is being upgraded or reloaded.

Figure 6:
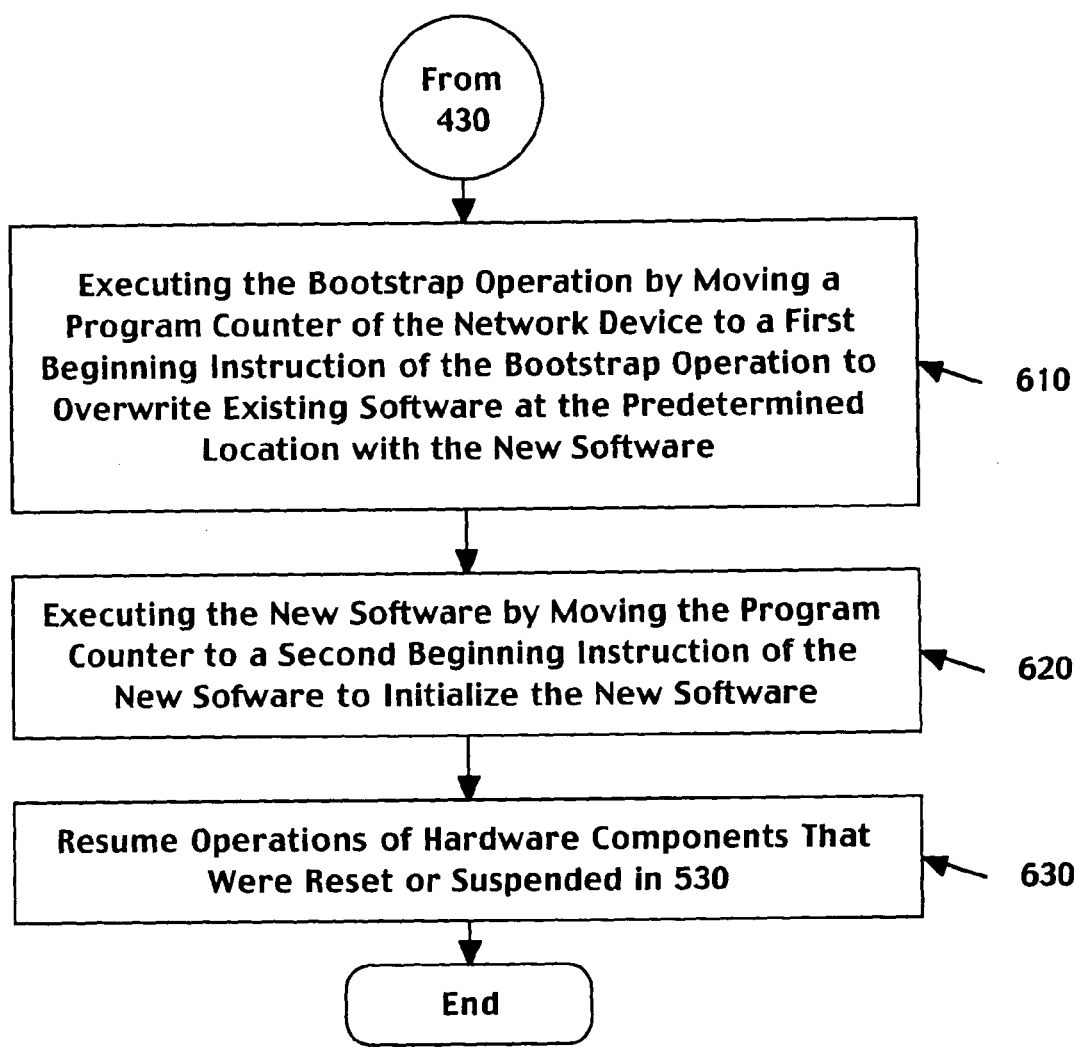
FIG. 6 is a flow chart illustrating steps in a computer implemented method for initializing and executing the new software with minimal disruption to communication sessions, in accordance with one embodiment of the present invention.

Turning now to FIG. 6, a flow chart 600 is described illustrating steps in a computer implemented method for upgrading and/or reloading software at layer two of a network device, in accordance with one embodiment of the present invention. Specifically, the method of flow chart 600 further describes the recovery process of the new software that implements the software operations of the network device. In one embodiment, the method of flow chart 600 is an extension of block 430 of flow chart 400. As such, the new software has been preloaded, and the bootstrap code has also been pre-loaded.

At 610, the present embodiment begins by moving a program counter of the network device to start execution of the bootstrap code. That is, the present embodiment moves the program counter to the beginning instruction of the bootstrap code. The bootstrap code overwrites the existing software with the new software that was previously pre-loaded in block 410 of flow chart 400. The existing software is located at the predetermined location of the memory, as previously discussed. The new software was previously pre-loaded and is located at the first memory location.

At 620, the present embodiment continues by executing the new software. Execution of the new software initializes the new software, and implements the software operations of the network device. The present embodiment executes the new software by moving the program counter to the beginning instruction of the new software. By initializing and executing the new software, the software operations can be upgraded, or reloaded upon failure, with minimal disruption to communication sessions through the network.

At 630, the present embodiment continues by resuming operations of the hardware components. The hardware components were previously reset or suspended when performing the minimal reset of block 430 of flow chart 400.

In one embodiment, data is recovered after an upgrading or reloading of the software located at layer two of the ISO/OSI reference model. In the data portion of the software operations, there are two types of data: data that requires re-initialization after an upgrade or reload, and data that does not require re-initialization after an upgrade or reload. For example, certain counters comprise data that requires re-initialization. Also, routing tables comprise data that does not need re-initialization. Data of the first type or the second type typically is lost during an upgrade of the software associated with layer two of the ISO/OSI reference model. In that case, the data would need to be regenerated.

However, in the present embodiment, versioning for data and tables that require carry over overcome the limitation of losing data during when upgrading or reloading software at layer two of the ISO/OSI reference model. Specifically, the present embodiment includes a mechanism to copy the relevant tables and data structures to known regions of the memory of the network device before upgrading or reloading software of the network device. Later, after the upgrading or reloading of the software of the network device, a re-initialization routine is performed to read the saved tables and data structures from the known regions of memory. In this way, the data and the table information is reacquired.

In another embodiment of the present invention, the operating code of the network device is reloaded with minimal delay when the new operating code does not include any software upgrades. The present embodiment maintains a copy of the operating code in memory. In the case of software failure, the operating code remains unchanged. In that case, the operating code does not need copying. As such, the present embodiment re-initializes the data, as previously described, and then restarts the control code.

Accordingly, embodiments of the present invention are capable of upgrading system software (e.g., software operations for a network device) with minimal delay. This reduces the resultant downtime of a network device. Other embodiments are capable of reloading system software (without loading any software upgrades) with minimal delay, in the case of system failure. As a result, embodiments of the present invention are capable of bringing back up to operation a network device without resetting all the hardware components in the network device. In addition, embodiments of the present invention are capable of upgrading and/or reloading system software while limiting the impact on the control plane of the network device.

While the methods of embodiments illustrated in flow charts 300, 400, and 600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for upgrading and/or reloading software at layer two of the ISO/OSI reference model of a network device with minimal disruption to communication is described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method of resetting an electronic device comprising:

separating software operations associated with layer two of an International Standardization Organization Open Systems Interconnect (ISO/OSI) reference model from other layers in said ISO/OSI reference model, wherein said electronic device is configured to implement said software operations, and wherein a copy of said software operations is stored locally on said electronic device;

resetting said software operations in said layer two of said electronic device using said copy of said software operations, wherein a layer two functionality associated with said software operations is temporarily unavailable during said software reset;

maintaining continuity for a communication session between said electronic device and other electronic devices coupled together through a network during said software reset; and recovering execution of said layer two functionality associated with said software operations before said continuity of said communication session is terminated.

2. The method of claim 1, further comprising:

separating a data plane and a control plane in said electronic device, wherein said data plane is associated with said layer two, and wherein said control plane is associated with layers above said layer two of said ISO/OSI reference model.

3. The method of claim 1, further comprising:
separating a data plane and a physical layer of said electronic device, wherein said data plane is associated with said layer two, and wherein said physical layer is associated with layer one of said ISO/OSI reference model; and
maintaining continuity of said communication session between said electronic device and said other electronic devices coupled together through said network at said layer one of said ISO/OSI reference model during said software reset.

4. The method of claim 1, wherein said copy of said software operations is stored at a first memory location of said electronic device, and wherein said method further comprises:
loading a bootstrap code to a second memory location of said electronic device, wherein said bootstrap code is loaded in response to a request to reset said electronic device, wherein said bootstrap code is configured to load said copy of said software operations from said first memory location to a predetermined location of said electronic device, and wherein said copy of said software operations replaces said software operations previously residing at said predetermined location.

5. The method of claim 4, further comprising:
executing said bootstrap code by moving a program counter of said electronic device to a first beginning instruction of said bootstrap code to overwrite said software operations at said predetermined location with said copy of said software operations; and
executing said copy of said software operations by moving said program counter to a second beginning instruction of said copy of said software operations.

6. The method of claim 1, further comprising:
performing a minimal reset of hardware components associated with said layer two such that interruptions to an operating system of said electronic device are minimized.

7. The method of claim 6, wherein at least one of said hardware components comprises a line card.

8. The method of claim 1, wherein said network comprises the Internet.

9. The method of claim 1, wherein said electronic device comprises a network device.

10. The method of claim 1, wherein said continuity of said communication session between said electronic device and said other electronic devices is maintained at ISO/OSI layers above said layer two during said software reset.

11. The method of claim 1, further comprising:
storing layer two information associated with usage of said software operations prior to resetting said software operations; and
restoring said layer two information associated with said usage of said software operations after recovering execution of said layer two functionality.

12. A method comprising:
initiating a communication between an electronic device and one or more devices in a network, wherein a data plane and a control plane in said electronic device are separated, wherein said data plane and said control plane are configured to control said communication between said electronic device and said one or more devices in said network, and wherein said data plane is associated with layer two of an International Standardization Organization Open Systems Interconnect (ISO/OSI) reference model;
loading a bootstrap code to said electronic device, wherein said bootstrap code is configured to load software operations for said electronic device;
loading said software operations in said data plane, wherein data plane functionality is temporarily disabled during said loading of said software operations;
maintaining continuity in said communication at layer one of said ISO/OSI reference model during said loading of said software operations, wherein said data plane is separated from said layer one of said electronic device;
maintaining continuity in said communication at layers above said layer two during said loading of said software operations; and
recovering execution of said data plane functionality before said continuity, in said communication is terminated at said control plane.

13. The method of claim 12, further comprising:
pre-loading new software implementing said software operations to a first memory location of said electronic device, wherein said bootstrap code is loaded to a second memory location of said electronic device, and wherein said bootstrap code loads said new software to a predetermined location storing existing software implementing said software operations.

14. The method of claim 13, further comprising:
moving a program counter of said electronic device to a first beginning instruction of said bootstrap code for executing said bootstrap code to overwrite said existing software at said predetermined location with said new software; and
executing said new software by moving said program counter to a second beginning instruction of said new software to initialize said new software.

15. The method of claim 13, further comprising:
upgrading said software operations that are implemented within said new software.

16. The method of claim 13, further comprising:
reloading said software operations that are implemented within said new software.

17. The method of claim 12, further comprising:
performing a minimal reset of hardware components associated with said data plane such that interruptions to an operating system of said electronic device are minimized.

18. The method of claim 17, further comprising:
resuming operations of said hardware components.

19. The method of claim 12, wherein said electronic device comprises a network device.

20. The method of claim 12, wherein said bootstrap code is loaded in response to a request to reset said electronic device, and wherein said software operations are preloaded on said electronic device prior to receiving said request to reset said electronic device.

21. The method of claim 12, wherein a copy of said software operations is stored on said electronic device, and wherein said bootstrap code loads said copy of said software operations from a first memory location of said electronic device to a second memory location of said electronic device.

22. A system comprising:
means for separating software operations associated with layer two of an International Standardization Organization Open Systems Interconnect (ISO/OSI) reference model from other layers in said ISO/OSI reference model, wherein an electronic device is configured to implement said software operations;
means for storing layer two information associated with usage of said software operations;

means for loading said software operations in said layer two of said electronic device, wherein said layer two is temporarily disabled during said loading of said software operations;

means for maintaining continuity for a communication session between said electronic device and other electronic devices coupled together through a network while said layer two is temporarily disabled;

means for restoring said layer two information associated with said usage of said software operations; and means for recovering execution of said software operations at said layer two before said continuity of said communication session is terminated.

23. The system of claim 22, wherein said means for separating software operations further comprises:

means for separating a data plane and a control plane in said electronic device, said data plane being associated with said layer two, and said control plane being associated with layers above said layer two of said ISO/OSI reference model.

24. The system of claim 22, wherein said means for maintaining continuity further comprises:

means for maintaining continuity at layer one of said ISO/OSI reference model; and means for maintaining continuity at layers above said second layer of said ISO/OSI reference model.

25. The system of claim 22, wherein said means for loading said software operations further comprises:

means for pre-loading new software implementing said software operations to a first memory location of said electronic device; and means for loading a bootstrap code to a second memory location of said electronic device, wherein said bootstrap code is configured to load said new software to a predetermined location, and wherein said predetermined location is configured to store existing software implementing said software operations.

26. The system of claim 25, wherein said means for recovering execution further comprises:

means for executing said bootstrap code by moving a program counter of said electronic device to a first beginning instruction of said bootstrap code to overwrite said existing software at said predetermined location with said new software; and means for executing said new software by moving said program counter to a second beginning instruction of said new software to initialize said new software.

27. The system of claim 22, wherein said network comprises the Internet.

28. The system of claim 22, wherein said electronic device comprises a network device.

29. The system of claim 22, wherein said software operations loaded to said electronic device comprise a copy of said software operations, and wherein said copy of said software operations resets said electronic device.

30. The system of claim 22, wherein said software operations loaded to said electronic device comprise a new version of said software operations, and wherein said new version of said software operations upgrades said electronic device.

31. A computer-readable medium having stored thereon computer executable instructions that, if executed by a system, cause said system to perform operations comprising:

separating software operations associated with layer two of an International Standardization Organization Open Systems Interconnect (ISO/OSI) reference model from other layers in said ISO/OSI reference model, wherein an electronic device is configured to implement said software operations;

loading said software operations in said layer two of said electronic device, wherein a layer two functionality associated with said software operations is temporarily unavailable during said loading of said software operations;

maintaining continuity for a communication session between said electronic device and other electronic devices coupled together through a network while said layer two functionality is unavailable; and recovering execution of said software operations at said layer two before said continuity of said communication session is terminated.

32. The computer-readable medium of claim 31, wherein said operations further comprise:

separating a data plane and a control plane in said electronic device, wherein said data plane is associated with said layer two, and wherein said control plane is associated with layers above said layer two of said ISO/OSI reference model.

33. The computer-readable medium of claim 31, wherein said operations further comprise:

maintaining continuity at layer one of said ISO/OSI reference model; and maintaining continuity at layers above said second layer of said ISO/OSI reference model.

34. The computer-readable medium of claim 31, wherein said operations further comprise:

pre-loading new software implementing said software operations to a first memory location of said electronic device; and loading a bootstrap code to a second memory location of said electronic device, wherein said bootstrap code is configured to load said new software to a predetermined location, and wherein said predetermined location is configured to store stung existing software implementing said software operations.

35. The computer-readable medium of claim 34, wherein said operations further comprise:

executing said bootstrap code by moving a program counter of said electronic device to a first beginning instruction of said bootstrap code to overwrite said existing software at said predetermined location with said new software; and executing said new software by moving said program counter to a second beginning instruction of said new software to initialize said new software.

36. The computer-readable medium of claim 31, wherein said operations further comprise:

performing a minimal reset of hardware components associated with said layer two such that interruptions to an operating system of said electronic device are minimized.

37. The computer-readable medium of claim 36, wherein at least one of said hardware components comprises a line card.

38. The computer-readable medium of claim 31, wherein said network comprises the Internet.

39. The computer-readable medium of claim 31, wherein said electronic device comprises a network device.

40. The computer-readable medium of claim 31, wherein said operations further comprise:

storing layer two information associated with usage of said software operations prior to loading said software operations; and restoring said layer two information associated with said usage of said software operations after recovering execution of said layer two functionality.

41. The computer-readable medium of claim 31, wherein said software operations are loaded as part of loading said electronic device.

42. A system for resetting an electronic device comprising:

means for separating software operations associated with layer two of an International Standardization Organization Open Systems Interconnect (ISO/OSI) reference model from other layers in said ISO/OSI reference model, said electronic device implementing said software operations;

means for resetting said software operations in said layer two of said electronic device, wherein said layer two is temporarily disabled during said resetting of said software operations;

means for maintaining continuity for a communication session between said electronic device and other electronic devices coupled together through a network;

means for recovering execution of said software operations at said layer two before said continuity of said communication session is terminated; and means for performing a minimal reset of hardware components associated with said layer two such that interruptions to an operating system of said electronic device are minimized, wherein at least one of said hardware components comprises a line card.

43. The system of claim 42, wherein said line card comprises an Ethernet card, wherein an operation of said Ethernet card is interrupted, and wherein said continuity for said communication session between said electronic device and said other electronic devices is maintained while said operation of said Ethernet card is interrupted.

* * * * *

UNITED STATES PATENT AND TRADEMARK OFFICE
CERTIFICATE OF CORRECTION

| | |
|---|---|
| PATENT NO. | : 7,814,481 B1 |
| APPLICATION NO. | : 10/646453 |
| DATED | : October 12, 2010 |
| INVENTOR(S) | : John Thomas Welder |

It is certified that error appears in the above-identified patent and that said Letters Patent is hereby corrected as shown below:

On column 12, line 15, CLAIM 12, after "said" delete "continuity," and insert -- continuity --.

On column 14, line 38, CLAIM 34, after "store" delete "stung".

Signed and Sealed this
Twenty-fourth Day of April, 2012

David J. Kappos
*Director of the United States Patent and Trademark Office*